US011268595B2

(12) United States Patent
Chazotte

(10) Patent No.: US 11,268,595 B2
(45) Date of Patent: Mar. 8, 2022

(54) INLINE TRANSMISSION WITH TWO INTERMEDIATE SHAFTS

(71) Applicant: GETRAG FORD TRANSMISSIONS GMBH, Cologne (DE)

(72) Inventor: Jean-Pierre Chazotte, Frechen (DE)

(73) Assignee: GETRAG FORD TRANSMISSIONS GMBH, Cologne (DE)

( * ) Notice: Subject to any disclaimer, the term of this patent is extended or adjusted under 35 U.S.C. 154(b) by 17 days.

(21) Appl. No.: 16/642,502

(22) PCT Filed: Aug. 14, 2018

(86) PCT No.: PCT/EP2018/072062
§ 371 (c)(1),
(2) Date: Feb. 27, 2020

(87) PCT Pub. No.: WO2019/042766
PCT Pub. Date: Mar. 7, 2019

(65) Prior Publication Data
US 2020/0182332 A1 Jun. 11, 2020

(30) Foreign Application Priority Data

Aug. 28, 2017 (DE) .......................... 102017119687.0
Jul. 5, 2018 (DE) .......................... 102018116328.2

(51) Int. Cl.
*F16H 3/097* (2006.01)
*F16H 57/021* (2012.01)
*F16H 3/093* (2006.01)

(52) U.S. Cl.
CPC ........... *F16H 3/097* (2013.01); *F16H 57/021* (2013.01); *F16H 2003/0933* (2013.01); *F16H 2200/0052* (2013.01); *F16H 2200/2038* (2013.01)

(58) Field of Classification Search
CPC .................. F16H 3/097; F16H 57/021; F16H 2003/0933; F16H 2200/0052;
(Continued)

(56) References Cited

U.S. PATENT DOCUMENTS 5,383,375 A 1/1995 Ogawa et al.
7,231,843 B2 * 6/2007 Gumpoltsberger ..... F16H 3/006
74/329
9,068,627 B2 * 6/2015 Wechs .................... F16H 3/006

FOREIGN PATENT DOCUMENTS

DE 1059777 B 6/1959
DE 102011052440 A1 2/2013
(Continued)

*Primary Examiner* — Victor L MacArthur
(74) *Attorney, Agent, or Firm* — Richard M. Goldberg

(57) ABSTRACT

A manual transmission includes a coaxially arranged input shaft and output shaft, a first intermediate shaft and parallel second intermediate shaft, spaced from the input shaft, a drive side gear pair with a drive gear rotationally fixed on the input shaft and an intermediate gear rotationally fixed on the first intermediate shaft, and an output side gear pair with a second intermediate gear rotationally fixed on the second intermediate shaft and an output gear rotationally fixed on the output shaft, wherein, drive torque is transferred from the input shaft to the output shaft over the drive side gear pair, while no drive torque is transferred over the output side gear pair and, with at least three other switchable gears, drive torque is transmitted from the input shaft to the output shaft over the output side gear pair, while no drive torque is transmitted over the drive side gear pair.

14 Claims, 3 Drawing Sheets

(58) Field of Classification Search
CPC ..... F16H 2200/2038; F16H 2200/0013; F16H 2200/0026; F16H 2200/0047; F16H 2200/0056; F16H 3/093
See application file for complete search history.

(56) References Cited

FOREIGN PATENT DOCUMENTS

| | | |
|---|---|---|
| DE | 102013218519 A1 | 3/2015 |
| JP | H1-93651 A | 4/1989 |

\* cited by examiner

INLINE TRANSMISSION WITH TWO INTERMEDIATE SHAFTS

BACKGROUND OF THE INVENTION

The invention relates to a manual transmission with several switchable gears for a motor vehicle, wherein the manual transmission comprises an input shaft, an output shaft disposed coaxially with the input shaft, as well as a first intermediate shaft and a second intermediate shaft, which are disposed parallel to and at a distance from the input shaft.

Such a transmission, which is also referred to as an inline transmission, is known, for example, from DE 10 2011 052 440 A1. The inline transmission, disclosed there, comprises a gear pairing on the drive side, which has a drive gear and a first intermediate gear. The drive gear is arranged on the input shaft in a rotationally fixed manner and meshes with the first intermediate gear, which is disposed in a rotationally fixed manner on the first intermediate shaft. Via the gear pair on the drive side, a drive torque, which is generated by a motor and is guided into the input shaft via a clutch, is passed on to the first intermediate shaft. The drive torque can be switched from the first intermediate shaft over several gear pairings to the output shaft. The gear pairings each have a fixed gear and a switchable idler gear, each idler gear being connected rotationally over a gear shift clutch with one of the gear shafts. Accordingly, a gear shift clutch can be assigned to each gear of the transmission. If the gear shift clutch is closed or if it is located in a shift position, the gear in question is engaged.

Due to the gear pairing on the drive side, a constant transmission between the input shaft and the first intermediate shaft, which determines the total transmission of each gear, is preset. In the following, this constant transmission is referred to as the drive constant. At a value clearly greater than 1, the drive constant has a positive effect on the acting gearing forces in the transmission and the efficiency of the manual transmission, because the intermediate shaft rotates slowly. Basically, a large drive constant is helpful for realizing the lower gear with large overall transmissions.

However, if the gear pairing on the drive side has a drive constant, which is too large, the realization, in particular, of the total transmission of a highest gear (that is, the gear with the smallest ratio of the rpm of the input shaft to the rpm of the output shaft) becomes difficult. The required total transmission of the highest gear of the manual transmission may possibly no longer be achievable under the given boundary conditions (axle distances, packaging) because the drive constant simply is too large. If a smaller value is selected for the drive constant, there is more freedom for the design of the higher gears; however, it is obtained at the expense of the lower gears. In the manual transmission of the DE 10 2011 052 440, this problem is solved with a second intermediate shaft. In spite of a comparatively small drive constant, which determines the individual total transmissions of all gears of the manual transmission, this makes it possible to realize large enough transmissions for a reverse gear and for a crawler gear.

In addition, manual transmissions with an output constant are also known from the prior art. The respective manual transmission, moreover, has a gear pairing on the output side with an output gear disposed rotationally fixed on the output gear. Large output constants lead to a comparatively rapidly rotating intermediate shaft with a better ability to switch gears. The overall transmission ratios of the individual gears always depend on the output constant, so that here also basically the difficulty arises of providing a manual transmission of simple structure with several gears, which covers as large as possible a range of different overall transmissions.

SUMMARY OF THE INVENTION

The invention is therefore based on the object of providing a manual transmission for a motor vehicle, the structure of which is simple and compact and which has a large range of different gear transmissions.

The object underlying the invention is accomplished with the manual transmission of the claims. Examples of the invention are given in the dependent claims.

In accordance with the invention, the manual transmission has a gear pairing on the drive side, as well as a gear pairing on the output side. The gear pairing on the drive side has the drive gear, rotationally fixed on the input shaft and the first intermediate gear, rotationally fixed on the first intermediate shaft, while the gear pairing on the output side has a second intermediate gear, rotationally fixed on the second intermediate shaft and the drive gear, which is rotationally fixed on the output shaft. In the traction mode of the transmission, that is, when drive torque is introduced from the engine over the input shaft into the manual transmission to drive the motor vehicle, in the engaged state of at least one of the switchable gears, the drive torque is transmitted from the input shaft to the output shaft over the gear pairing on the drive-side, while no drive torque is transmitted over the gear pairing on the output side. In addition, in each of the engaged state of at least three other switchable gears, drive torque is transmitted from the input shaft to the output shaft over the gear pairing on the output side, while no drive torque is transmitted over the gear pairing on the drive side. Accordingly, the inventive manual transmission has at least three gears, the overall transmission ratio of which (ratio of the speed of the input shaft to the speed of the output shaft with the gear engaged) is independent of the drive constants. At the same time, there is at least one gear in the manual transmission, the overall transmission of which is independent of the output constant. Due to this independence of the one switchable gear and of the other three switchable gears, a manual transmission of simple structure can be provided, which has a large transmission ratio spread (range between the largest total transmission and the smallest total transmission).

In one embodiment, in the engaged state of a crawler gear, the drive torque is transmitted over gear pairing on the drive side. The crawler gear is the forwards gear in the manual transmission, through which the greatest transmission between the input shaft and the output shaft can be realized. With the crawler gear engaged, the gear pairing on the output side preferably is switched load-free.

Alternatively, or additionally to the crawler gear, a drive torque can transmit over the gear pairing on the drive side in the engaged state of a reverse gear. The gear pairing on the output side can also be switched load-free here.

In the engaged state of a second forwards gear, the transmission of which is less than the transmission ratio of the crawler gear, the drive torque can be transmitted over the gear pairing on the output side, while then the inventive gear pairing on the drive-side does not transmit a drive torque. Accordingly, a manual transmission is disclosed, for which, depending on the gear engaged, the drive torque is passed either over the gear pairing on the drive-side or over the gear pairing on the output side, the other gear pairing not transmitting any drive torque.

In the engaged state of a further gear of the manual transmission, the first intermediate shaft may be non-rotatably connected with the second intermediate shaft. Moreover, the drive torque can be guided over the gear pairing on the drive-side, as well as over the gear pairing on the output side. Preferably, the simultaneous use of the gear pairing on the drive-side and of the gear pairing on the output side for the transmission of drive torque is present only in a single gear of the manual transmission. By these means, a particularly simple manual transmission may be realized. For this further gear, which preferably corresponds to a first forward gear of the manual transmission, the total transmission ratio corresponds to the product of the drive constant and the output constant. Alternatively, this further gear may also be another reverse gear.

A preferred embodiment can be described by the following Table. An x means that the transmission of a gear (forward/reverse) depends on the corresponding constant. For example, the transmission of the fourth forward gear does not depend on the drive constant or on the output constant here. Preferably, two further forwards gears are provided (fifth and sixth forwards gears). The drive constant preferably assumes a value between 2 and 4. The drive constant may correspond to two to three times the output constant.

TABLE

The Dependence of the Drive/Output Constant for an Example

| | Drive Constant | Output Constant |
|---|---|---|
| Reverse Gear | X | — |
| Crawling gear | X | — |
| First Forwards Gear | X | X |
| Second Forwards Gear | — | X |
| Third Forwards Gear | — | X |
| Fourth Forwards Gear | — | — |
| Further Forwards Gears | — | X |

In one embodiment, the manual transmission has no further input shafts. It is therefore not a dual-clutch transmission, which has two input shafts. For this embodiment, the manual transmission would have only a single input shaft. Preferably also, it is not a question here of a transmission, which branches the drive torque-branching transmission and where torque is transmitted simultaneously in the axial direction of the first intermediate shaft and in the axial direction of the second intermediate shaft (partially).

The first intermediate shaft and the second intermediate shaft may be disposed coaxially. In one embodiment, the first intermediate shaft is formed as an inner shaft and the second intermediate shaft as a hollow shaft.

The first intermediate gear may be disposed at one end of the first intermediate shaft. Preferably, this end is a drive-side end of the first intermediate shaft, which is facing the drive or the engine of the motor vehicle.

An idler gear or fixed gear for the crawler gear may be disposed at another end of the first intermediate shaft. Alternatively, at the other end of the first intermediate shaft, a fixed gear or an idler gear for the reverse gear may be disposed. The arrangement of a gear, such as a fixed gear or an idler gear, at one of the two ends of the first intermediate shaft means that there is no further gear of the manual transmission at this end, which is used for transmitting a drive torque and is axially less distanced from the relevant end of the end of the intermediate shaft.

On the second intermediate shaft, a first dual gear shifting clutch may be disposed, by means of which, in a first switching position, the first intermediate gear can be connected and, in a second switching position, an idler gear, rotationally fixed on the second intermediate shaft, may be rotationally connected with the second intermediate shaft.

Preferably, the first forward gear of the manual transmission should be engaged in the first shifting position of the first dual gear shift clutch. The idler gear, which is disposed on the second intermediate shaft and can be non-rotatably connected with said dual gear shift clutch, can be assigned to the second forward gear of the manual transmission.

In one embodiment, an intermediate plate is provided, which supports the input shaft and/or the output shaft, as well as the first intermediate shaft and/or the second intermediate shaft. The intermediate plate may be disposed between the gear pairing on the output side and the fixed gear or the idler gear of the reverse gear. The intermediate plate can accommodate a first intermediate bearing, at which the input shaft and the output shaft are supported. The support can be such that an axial hollow section of the output shaft is disposed, in the radial direction, between the intermediate bearing and the input shaft. The input shaft is then supported at the first intermediate bearing over the axial hollow section of the output shaft, which can encompass one end of the input shaft radially.

The intermediate plate can accommodate a second intermediate bearing, in order to support the first intermediate shaft and/or the second intermediate shaft. Preferably, the second intermediate bearing supports the first, as intermediate shaft, which is formed as an inner shaft.

In the axial direction, a second dual gear shift clutch may be disposed between the first dual gear shift clutch and the gear pairing on the output side, in order to connect idler gears of further gears, which are disposed on the input shaft or the second intermediate shaft in a rotationally fixed manner with the input shaft or the second intermediate shaft. Preferably, these further forward gears are a third forward gear and a fourth forward gear. If the idler gears of the third forward gear and the fourth forward gear are on the input shaft, the second dual gear shift clutch is also disposed on the input shaft. In an embodiment, the second dual gear shift clutch connects a gear of a direct gear (direct forward gear) in a rotationally fixed manner with the input shaft and, when the direct gear is engaged, the input shaft and the output shaft revolve at the same speed. The direct gear may be formed as a fixed gear on the output shaft, this fixed gear, relative to the input shaft, having the characteristics of an idler gear seated on the input shaft.

If the direct gear is engaged, no drive torque is transmitted over the drive-side gear pairing on the input side or on the output side. Providing a direct gear makes it clear that the manual transmission can have at least one shiftable gear, the transmission of which does not dependent on the drive constant or on the output constant. In a preferred embodiment, however, it is only a single switchable gear, which has this said independence.

The idler gear of the fourth forward gear can also be the output gear, which is a part of the gear pairing on the output side and is rotationally fixed to the output shaft. When the direct gear is engaged, the dual gear shifting clutch connects the input shaft in a torque-proof manner with driven gear on the output shaft. The driven wheel thus has a double function.

In the axial direction, a further gear shift clutch, preferably in the form of a third double gear shift clutch, may be provided between the first double gear shift clutch and the second double gear shift clutch, in order to non-rotatably connect idler gears of further forward gears, disposed on the input shaft or the second intermediate shaft, with the input shaft or the second intermediate shaft. Preferably, the second and the third double gear shift clutches are both disposed on the input shaft. However, it is also conceivable that they are both seated on the second intermediate shaft or, alternatively, are distributed over different shafts. The further forwards gears, which may be engaged with the help of the third double gear shift clutch, can be a fifth and sixth forward gear. If it is assumed that the fourth forward gear is formed as a direct gear, the second dual gear shift clutch and the third dual gear shift clutch may be realized with a transmission ratio unequal to 1, namely two forward gears, which have a transmission ratio of less than 1 (fifth and sixth forward gears) and a forward gear (third forward gear), which has a transmission ratio greater than 1. It has been shown that by the realization of the fourth forward gear (transmission ratio equal to 1) as a direct gear, a particularly good gradation of the gear can be achieved, whereby it is to be considered that by the above-described double function of the output gear, there is a dependence between the transmission ratios of the forward gears.

Accordingly, the idler gears of the following forward gears, seen from the gear pairing on the drive side, can be lined up in the following dual gear shift clutch sequence: second forward gear, fifth forward gear, sixth forward gear, third forward gear, fourth forward gear.

In one embodiment, a gear shift coupling is provided to connect the idler gear of the reverse gear to the shaft on which the idler gear is disposed, whereby the idler gear is disposed in the axial direction between the gear pairing on the output side and the gear shift coupling. This enables easy mounting of a reverse gear, which is necessary for reversing the direction of rotation of the reverse gear, since the reverse gear is located in the immediate vicinity of the intermediate plate.

Preferably, the gear shift coupling is formed as a dual gear shift clutch, which can thus also be referred to as a fourth dual gear shifting clutch. This fourth dual gear switch clutch can be used for engaging the crawler gear. It is preferred here that the idler gear of the reverse gear be disposed axially closer to the gear pairing on the output side than the idler gear of the crawler gear. This has the advantage that the manual transmission with the crawler gear and the six forward gears (which corresponds to a 7-speed transmission), by omitting the crawler gear by replacing the fourth dual gear shifting clutch with a single-acting gear shift coupling, in can be easily modified to a 6-gear transmission.

It should also be pointed out that instead of the third dual gear shift clutch, a single-acting gear shift coupling can be used, with which only one forward gear can be engaged. In the axial direction, this single-acting gear shift coupling can lie between the first dual gear switch clutch and the second gear shift coupling. In addition to the variants described in the above paragraph (7-speed transmission and 6-speed transmission), a 5-speed transmission can thus also be realized, whereby the different variants have basically the same transmission architecture.

BRIEF DESCRIPTION OF THE DRAWINGS

The invention is described in greater detail by means of the embodiments shown in the Figures.

DETAILED DESCRIPTION

Figure 1:
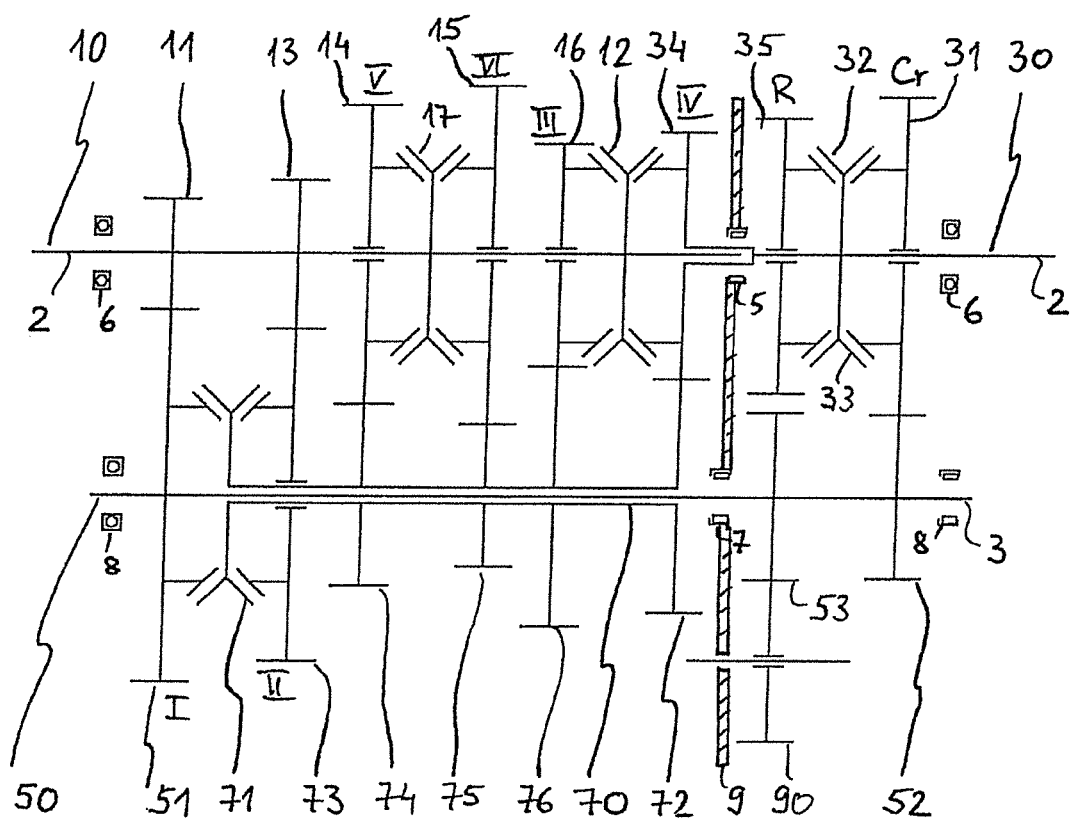
FIG. 1 diagrammatically shows the gear set of a first embodiment of the invention.

FIG. 1 schematically shows an inventive manual transmission for a motor vehicle. The manual transmission has an input shaft 10 and an output shaft 30, which is disposed coaxially with the input shaft 10. The two shafts 10, 30 are mounted so that they can rotate about an axis of rotation 2. Furthermore, the manual transmission has a first intermediate shaft or countershaft 50 and a second intermediate shaft 70, wherein the first intermediate shaft 50 is disposed as an inner shaft and the second intermediate shaft 70 is disposed as a coaxially arranged hollow shaft. The distance between the axis 2 an axis 3, about which the intermediate shafts 50, 70 are rotatably mounted may, for example, be 80 to 100 mm. Preferably, the manual transmission may be installed in the direction of travel of the motor vehicle. In this case, the direction of travel and the axes 2, 3 are parallel to one another.

On the input shaft 10, a drive gear 11 is disposed in a rotationally fixed manner. The drive gear 11 meshes with a first intermediate gear 51, which is rotationally fixed on the first intermediate shaft 50. The gears 11, 51 form a gear pairing on the drive side, by means of which a constant transmission (drive constant) between the input shaft 10 and the first intermediate shaft 50 is predetermined. The diameter of the first intermediate gear 51 is about 3 to 3.5 times as large as the diameter of the drive gear 11. This results in a corresponding value of 3 to 3.5 for the drive constant. It should be noted that the drive gear 11 meshes exclusively with the first intermediate gear 51. There are no further gears in the plane of gears 11, 51. Due to the meshing engagement, the first intermediate gear is connected rotationally fixed with the input shaft. A rotationally fixed connection with two components therefore does not require the components to rotate around the same axis at the same speed.

The first intermediate gear 51 is disposed at the drive-side end of the first intermediate shaft 50. At the opposite end of the first intermediate shaft 50, a fixed gear 52 is disposed, which meshes with a loose idler gear 31 seated on the output shaft 30. Over a fourth dual gear shifting clutch 32, which is disposed coaxially with the output shaft 30 and which is also referred to here as the fourth double-speed clutch, the idler gear 31 may be non-rotatably connected with the output shaft 30. A sliding sleeve 33 of the fourth dual gear shifting clutch 32 must assume a shifting position on the right in the representation of FIG. 1. In this shift position, a crawler gear Cr of the manual transmission is in the engaged state. In a traction operation of the motor vehicle with the crawling gear Cr engaged, a drive torque, fed into the input shaft 2, accordingly passes over the drive gear 11 and the therewith meshing with the first intermediate gear 51 reaches the first intermediate shaft 50 with the result that, over the gears 52, 31, the torque reaches the output shaft 30. A transmission of the crawler gear Cr comprises the drive constant of the gear pairing on the drive-side and the transmission, which results from the engagement of the fixed gear 52 on the first intermediate shaft 50 and the idler gear 31 on the output shaft. Since the diameter of the idler gear 31 is about 1.5 to 2 times as large as the diameter of the fixed gear 52, a (total) transmission ratio of 4.5 to 7 results for the crawler gear.

By means of a dual gear shifting clutch 71 (also called first dual gear shifting clutch) on the second intermediate shaft 70, the first intermediate gear 51 can be non-rotatably connected with the second intermediate shaft 70. The structure of the first dual gear shifting clutch 71 essentially corresponds to the structure of the fourth dual gear shifting clutch 32 with the sliding sleeve 33. In a simplification, the following starts out from a first/second or a right/left shifting position of one of the dual gear shifting clutches, although the shifting position actually refers to the respective shifting sleeve.

At a first or left switching position of the first dual gear shift clutch 71, that is, at a non-rotatable connection between intermediate gear 51 and the second intermediate shaft 70, a first forward gear I of the manual transmission is engaged. With the first forward gear I engaged, the drive torque is thus transmitted from the input shaft 10 to the second intermediate shaft 70. The drive torque is transmitted from the intermediate shaft 70 to the output shaft 30 via a second intermediate gear 72 formed as a fixed gear on the second intermediate shaft 70 and a meshing driven gear 34 designed as a fixed gear on the output shaft 30. The gear pairing, formed by the fixed gears 72, 34, can be referred to as the gear pairing on the output side, which, like the drive-side gear pairing on the input side with the fixed gears 11, 51, has a constant transmission (output side constant). The constant on the output side is 1, 2 to 1, 4. The (overall) translation of the first forward gear I thus corresponds to the product of the drive constant and the output constant. The result is a translation of the second forward gear II from 3.6 to 4.9.

To achieve a reverse gear R, a reverse wheel 90 is provided which meshes with a fixed gear 53 on the first intermediate shaft 50. The reverse gear 90 in turn meshes with an idler gear 35 on the output shaft 30. Similar to the crawler gear Cr, when reverse gear R is engaged, the torque flow runs from the input shaft 10 via the first intermediate shaft 50 to the output shaft 30. The second intermediate shaft 70 is switched load-free. This means that when the crawler gear Cr is engaged and the reverse gear R is engaged, no drive torque is passed through the second intermediate shaft 70, although it rotates due to the gear pair on the output side.

In the axial direction, the second intermediate shaft 70 is enclosed by the first intermediate gear 51 and the fixed gear 53 of the reverse gear R. The second intermediate shaft 70 is therefore shorter than the first intermediate shaft 50.

A fourth forward gear IV is engaged when the input shaft 10 is connected in a rotationally fixed manner to the driven gear 34 or to the output shaft 30 by means of a dual gear shifting clutch 12 (second dual gear shifting clutch) seated on the input shaft 10. The transmission ratio when fourth forward gear IV is engaged is 1. The second dual gear shifting clutch 12 is then in a right or first shift position. The fourth forward gear IV can also be referred to as a direct gear.

A fixed gear 13 and three idler gears 14, 15, 16 are also disposed on the input shaft 10. The idler gears 14, 15 can be connected to the input shaft 10 in a rotationally fixed manner by means of a double gear clutch 17 (third gear clutch) arranged between them. In addition to the non-rotatable connection of the output gear 34 with the input shaft 10, the second dual gear shift clutch 12 serves also for the non-rotatable connection of the idler gear 16 with the input shaft 10. For this purpose, the second dual gear shift clutch 12 is moved to a left shifting position.

The fixed gear 13 meshes with an idler gear 73 on the second intermediate shaft 70. If the third dual gear shift clutch 71 is in a right shifting position, the idler gear 73 is connected in a rotationally fixed manner with the intermediate shaft. By these means, a second forwards gear II can be realized. The drive torque thus runs over the input shaft and the gears 13, 73 to the second intermediate shaft. Finally, over the gear pairing on the output side, with the gears 72, 34, the drive torque reaches the output shaft 30.

The idler gears 14, 15, 16 of the input shaft 10 mesh with the fixed gears 74, 75 and 76, which are seated on the second intermediate shaft 70. With the dual gear shift clutches 17, 12 in appropriate shifting positions, a third forward gear III, a fifth forward gear V and a sixth forward gear VI can be realized. The torque of these gears III, V and VI flows, as in the second forward gear II, over the gear pairing on the output side. The (total) transmission of the sixth forward gear VI depends on the output constant and ranges from 0.6 to 0.7. A proper flow of the drive torque from input shaft 10 to output shaft 30 for driving the vehicle without tension in the transmission is possible only if only a single gear is engaged.

Aside from the additional shaft for the reverse gear 90 for reversing the direction at the reverse gear R, the manual transmission has no further shafts. The manual transmission comprises only the coaxial shafts 10, 30 and the intermediate shafts 50, 70, the latter also being disposed coaxially to one another. This makes it possible to realize a particularly simple and compact inline transmission with six forward gears and one additional crawler gear. The inline transmission can also be referred to as a 7-speed transmission, the crawler gear being considered as the first forward gear. By omitting the crawler gear Cr, the present transmission can be converted into a convenual 6-speed transmission without a crawler gear, for example, in order to reduce axial construction length.

A first intermediate bearing 5 is indicated in FIG. 1, by means of which the input shaft 10 and the output shaft 30 are additionally supported between two main bearings 6 of the shafts 10, 30. The first intermediate bearing 5, in turn, is supported on an intermediate plate 9 in the manual transmission, and is located in axial vicinity of the gear pairing on the output side with the gears 72, 34 and extends substantially perpendicular to the axis 2. Furthermore, FIG. 1 shows a second intermediate bearing 7, which is located in the axial direction between further main bearings 8 for mounting the intermediate shafts 50, 70. The second intermediate bearing 7 also is supported at the intermediate plate 9 or is incorporated therein. The intermediate plate 9 also serves to provide a mounting or to accommodate a mounting for the reverse gear 90.

Figure 2:
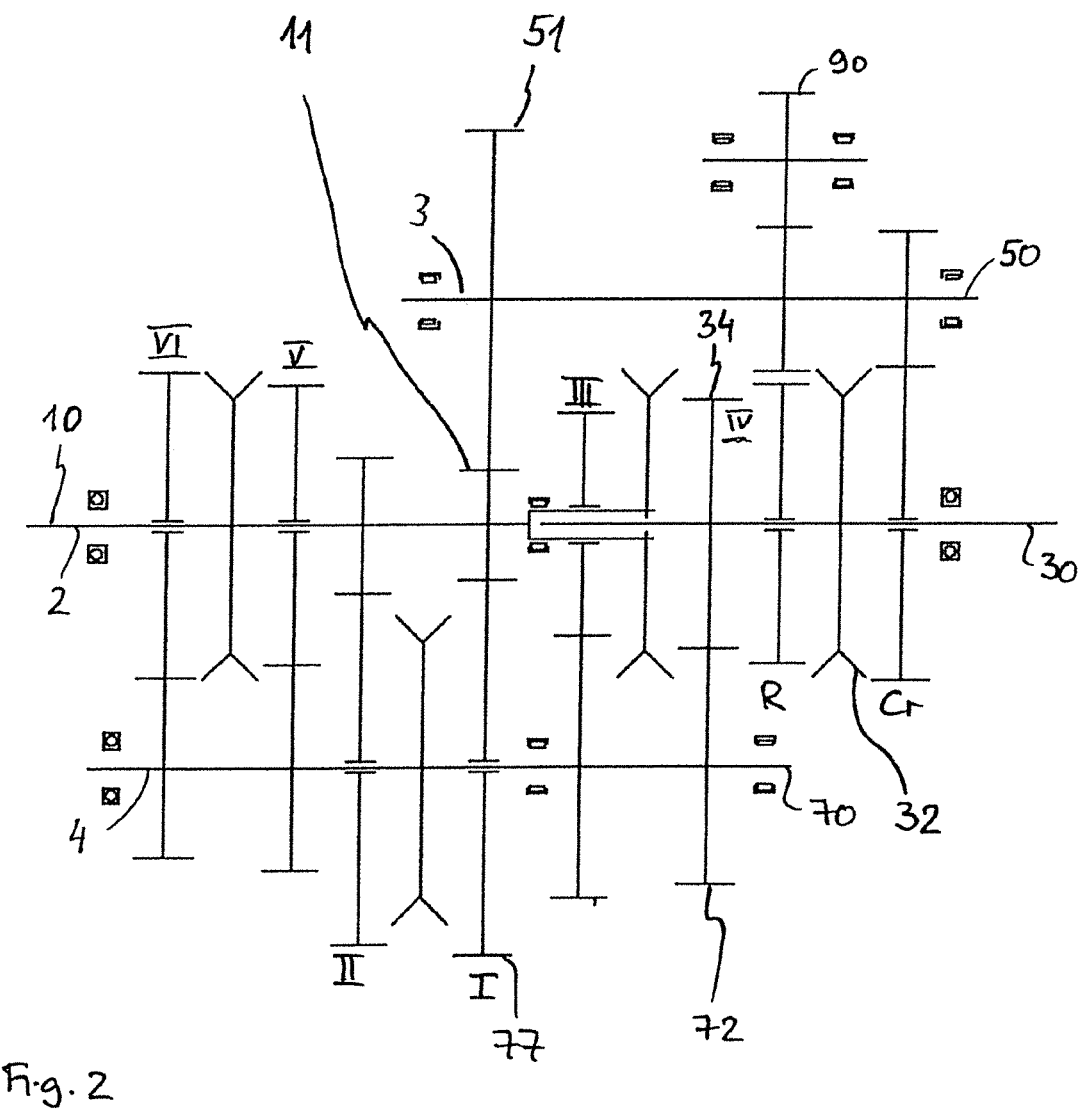
FIG. 2 diagrammatically shows the gear set of a second embodiment of the invention.

FIG. 2 shows a further embodiment of the invention. Components, which are identical with or similar to the components of the FIG. 1, have been provided with the same reference numbers. Here also, the input shaft 10 carries a drive gear 11, which is in meshing engagement with the first intermediate gear 51 of the first intermediate shaft 50 and specifies the drive constant. If the crawling gear Cr or the reverse gear R is engaged, the drive torque proceeds from the input shaft 10 over the gears, which cannot be shifted, to the first intermediate shaft 50. From there, the drive torque reaches the output shaft 30 when the gear shift clutch 32 is in the appropriate shifting position.

A significant difference from FIG. 1 consists of the arrangement of the intermediate shafts 50, 70, which are no longer coaxial, but are disposed at a distance from one another. The second intermediate shaft 70 rotates about an additional axis 4. The drive torque, which reaches the second intermediate shaft 70, is passed to the gear pairing on the output side with the fixed gears 72, 34 to the output shaft 30. The manual transmission of FIG. 2 also has six forward gears I to VI as well as the crawler gear Cr. Here also, the fourth forward gear IV is constructed as a direct gear with a transmission of 1. Another difference is that, for the formation of the first forward gear I, a separate idler gear 77 is provided which, like the first intermediate gear 51, meshes with the drive gear 11 and thus is located in the same plane as the first intermediate gear 51. However, there are two different gears here, whereas in the embodiment of FIG. 1 the first intermediate gear simultaneously assumes the function of the idler gear of the first forward gear I.

Figure 3:
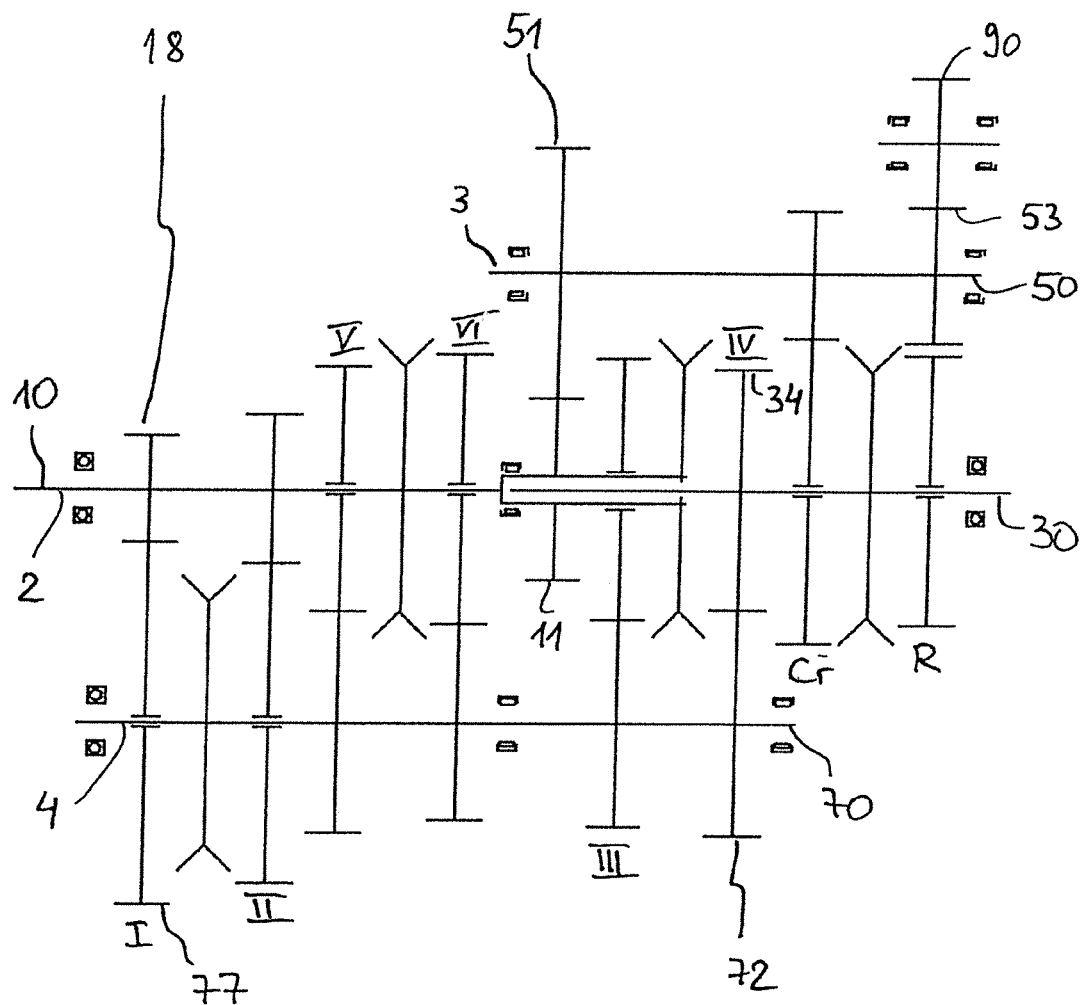
FIG. 3 diagrammatically shows the gear set of a third embodiment of the invention.

FIG. 3 shows a further embodiment of the invention. With respect to shafts 10, 30, 50 and 70, it is similar to the embodiment of FIG. 2. It differs in particular in the axial arrangement of the gears. For example, only the reverse gear R and not the crawler gear Cr is located at the axial end of the first intermediate shaft 50. However, the transmission ratios of the gears Cr and R continue to depend on the drive constant (see gears 11, 51). The transmission ratios of the remaining gears, with the exception of the fourth forward gear IV (direct gear), depend once again on the output constant (see gears 72, 34). A difference from FIG. 2 is that the drive gear 11 on the input shaft 10 meshes only with the first intermediate gear 51. The idler gear 77 of the first forward gear I is in a different plane than the first intermediate gear 51, which makes an additional fixed gear 18 on the input shaft 10 necessary.

LIST OF REFERENCE SYMBOLS

2 Axis
3 Axis
4 Axis
5 First intermediate bearing
6 Main bearing
7 Second intermediate bearing
8 Main bearing
10 Input shaft
11 Drive gear
12 Fourth dual gear shift clutch
13 Fixed gear
14 Idler gear
15 Idler gear
16 Idler gear
17 Third dual gear shift clutch
18 Fixed gear
30 Output shaft
31 Idler gear
32 Second dual gear shift clutch
33 Sliding sleeve
34 Fixed gear
50 First intermediate shaft
51 First intermediate gear
52 Fixed gear
53 Fixed gear
70 Second intermediate shaft
71 First dual gear shift clutch
72 Second intermediate gear
73 Idler gear
74 Fixed gear
75 Fixed gear
76 Fixed gear
77 Idler gear
90 Reverse gear

The invention claimed is:

1. A manual transmission with multiple switchable gears for a motor vehicle, comprising:
an input shaft and an output shaft which is disposed coaxially to the input shaft,
a first intermediate shaft and a second intermediate shaft, which are disposed parallel to and spaced apart from the input shaft,
a gear pair on a drive-side and including a drive gear arranged in a rotationally fixed manner on the input shaft and a first intermediate gear arranged in a rotationally fixed manner on the first intermediate shaft,
a gear pair on an output side and including a second intermediate gear arranged in a rotationally fixed manner on the second intermediate shaft and an output gear arranged in a rotationally fixed manner on the output shaft,
wherein, in a traction mode of the manual transmission:
in an engaged state of at least one switchable gear, drive torque is transferred from the input shaft to the output shaft over the gear pair on the drive side, while no drive torque is transferred over the gear pair on the output side and,
in an engaged state of at least three other switchable gears, drive torque is transmitted from the input shaft to the output shaft over the gear pair on the output side, while no drive torque is transmitted over the gear pair on the drive side,
wherein the first intermediate shaft and the second intermediate shaft are disposed coaxially, the first intermediate shaft being constructed as an inner shaft and the second intermediate shaft as a hollow shaft.

2. The transmission of claim 1, wherein, in an engaged state of a crawler gear, drive torque is transmitted over the gear pair on the drive-side.

3. The transmission of claim 1, wherein, in an engaged state of a second forward gear and in an engaged state at least one further forward gear, drive torque is transmitted over the gear pair on the output side.

4. The transmission of claim 1, wherein, in an engaged state of a reverse gear, drive torque is transmitted over the gear pair on the drive side.

5. The transmission of claim 1, wherein, in an engaged state of a further forward gear, the first intermediate shaft is rotationally connected with the second intermediate shaft.

6. The transmission of claim 1, wherein,
at one end of the first intermediate shaft, the first intermediate gear is arranged and,
at another end of the first intermediate shaft a fixed gear of a crawler is arranged.

7. The transmission of claim 1, further comprising a first double gear shifting clutch disposed on the second intermediate shaft by which, in a first shifting position, the first intermediate gear and, in a second shifting position, an idler gear, disposed rotationally free on the second intermediate shaft, are adapted to be rotationally connected with the second intermediate shaft.

8. The transmission of claim 7, further comprising a second gear shift clutch disposed in the axial direction between the first dual gear shift clutch and the gear pair on the output side in order to connect an idler gear of a further forward gear in a non-rotatable manner on the input shaft.

9. The transmission of claim 8, wherein the second dual gear shift clutch serves to connect a fixed gear on the output shaft with the input shaft in a rotationally fixed manner, wherein, with a direct gear engaged, the input shaft and the output shaft rotate at the same speed.

10. The transmission of claim 9, further comprising a gear shift clutch provided in the axial direction between the first dual gear shift clutch and the second dual gear shift clutch, in order to connect at least one idler gear, which is disposed on the input shaft and is a part of at least one further forward gear, in a rotationally fixed manner with the input shaft.

11. The transmission of claim 10, wherein the further gear shift clutch is formed as a third dual gear shift clutch, in order to connect two idler gears, which are disposed on the input shaft and are a part of two further forward gears, rotationally fixed with the input shaft.

12. The transmission of claim 11, wherein the second dual gear shift clutch and the third dual gear shift clutch are each disposed on the input shaft.

13. The transmission of claim 1, further comprising a gear shift clutch to connect an idler gear of a reverse gear with the shaft, on which the idler gear is disposed, the idler gear being disposed in the axial direction between the gear pair on the output side and the gear shift clutch.

14. A manual transmission with multiple switchable gears for a motor vehicle, comprising:
  an input shaft and an output shaft which is disposed coaxially to the input shaft,
  a first intermediate shaft and a second intermediate shaft, which are disposed parallel to and spaced apart from the input shaft,
  a gear pair on a drive-side and including a drive gear arranged in a rotationally fixed manner on the input shaft and a first intermediate gear arranged in a rotationally fixed manner on the first intermediate shaft,
  a gear pair on an output side and including a second intermediate gear arranged in a rotationally fixed manner on the second intermediate shaft and an output gear arranged in a rotationally fixed manner on the output shaft,
  an intermediate plate for supporting the input shaft, the output shaft and the first intermediate shaft, the intermediate plate being disposed between the gear pair on the output side and a fixed gear or an idler gear of a reverse gear,
  wherein, in a traction mode of the manual transmission:
    in an engaged state of at least one switchable gear, drive torque is transferred from the input shaft to the output shaft over the gear pair on the drive side, while no drive torque is transferred over the gear pair on the output side and,
    in an engaged state of at least three other switchable gears, drive torque is transmitted from the input shaft to the output shaft over the gear pair on the output side, while no drive torque is transmitted over the gear pair on the drive side,
  wherein the first intermediate shaft and the second intermediate shaft are disposed coaxially, the first intermediate shaft being constructed as an inner shaft and the second intermediate shaft as a hollow shaft.

* * * * *